C. Goddard,
Making Wooden Pins.
Nº 10,859.                    Patented May 2, 1854.
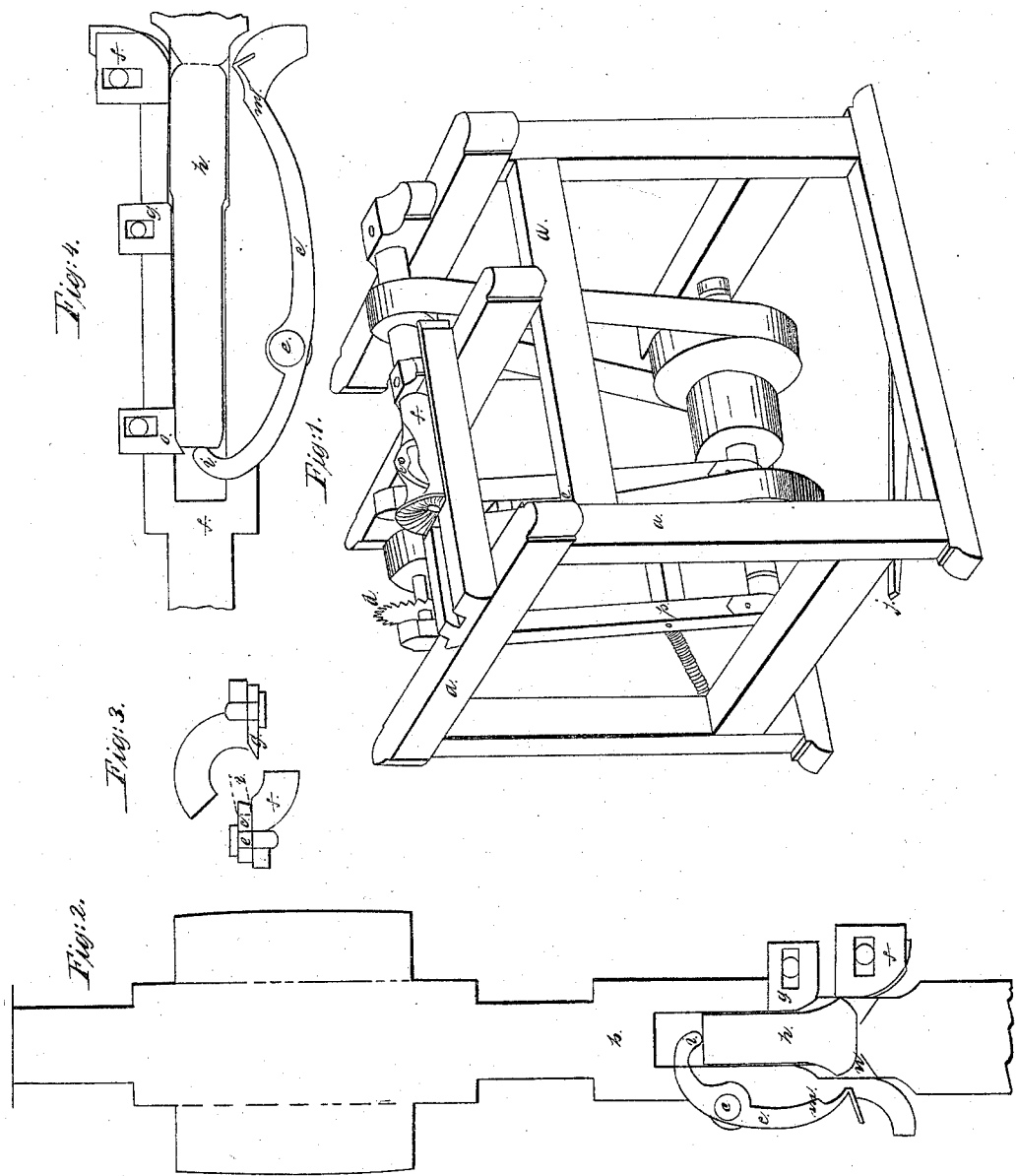

UNITED STATES PATENT OFFICE.

CURTIS GODDARD, OF EDINBURG, OHIO.

MACHINE FOR MAKING BED-PINS.

Specification of Letters Patent No. 10,859, dated May 2, 1854.

*To all whom it may concern:*

Be it known that I, CURTIS GODDARD, of Edinburg, in the county of Portage and State of Ohio, have invented a new and useful Machine for Making Bedstead-Pins, Clothes-Pins, &c.; and I do hereby declare the following to be a full, clear, and exact description of the construction and operation of the same, reference being had to the annexed drawings, making a part of this specification, in which—

Figure 1 is a perspective view of the machine. Fig. 2 is a longitudinal section of the hollow mandrel full size for making bedstead pins. Fig. 3 is a transverse section of said mandrel showing at what angles the cutters should be set and Fig. 4 is a longitudinal section of the mandrel as used for making clothes pins; like letters referring to corresponding parts in the several figures.

In Fig. 1 $a$ $a$ $a$ $a$ is the frame of the machine; $b$ is the body of the mandrel; $f$ is a cutter for taking the corners from the stick and bringing it to the size for the head of the pin; $g$ is a cutter for cutting the small part of the pin (the cutters $f$ and $g$ are made similar to those used in hollow mandrels for making broom handles &c.).

$o$ in Fig. 4 is a cutter for cutting the corner from the small end of the clothes pin; $c$ is a movable cutter turning on a pivot $e$ in such a manner that when the end of the pin $p$ presses the cutter at $i$ the end $m$ is forced down and cuts (by means of a V shaped edge) the part of the head $n$. The cutter $c$ is so formed that centrifugal force throws the end $m$ out when the pressure is removed at $i$; the pin is then removed and cut off with the saw $d$ which is hung in a frame vibrating upon the shaft $p$ and is worked by the treadle $j$ by means of a cord over a pulley at $r$ or other ways; the stick is then inserted again, &c.

What I claim as my invention and wish to secure by Letters Patent is—

The combination of cutters in the hollow mandrel with the movable cutter operated by the pin pressing the cutter at $i$ or by a disk of metal moved by the pin or other means substantially the same as herein set forth.

CURTIS GODDARD.

Witnesses:
L. HEYD,
JACKSON WHITE.